April 11, 1967    F. R. YOUNGREN    3,314,070
TAPERED RADOMES
Filed April 30, 1959
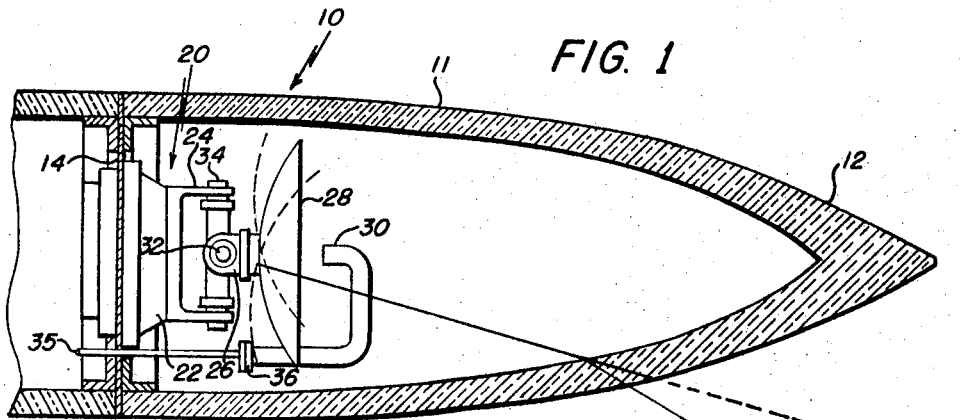
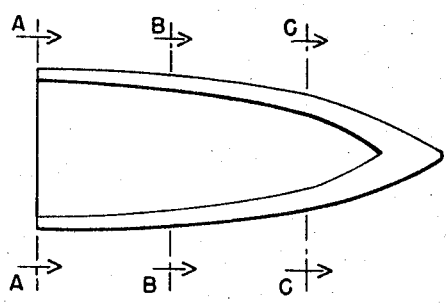
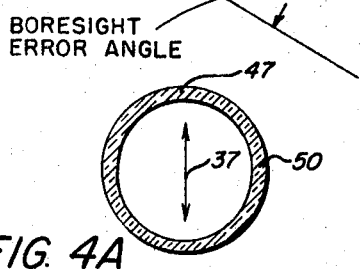
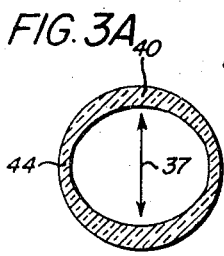 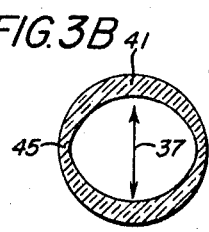 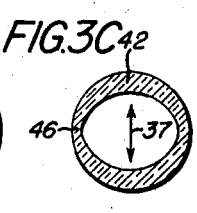
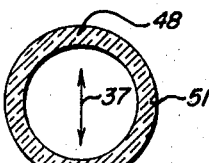
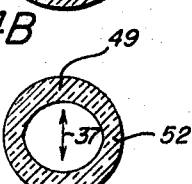
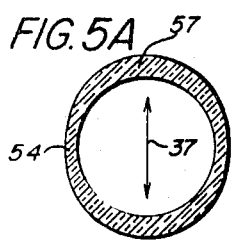 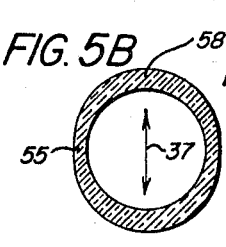 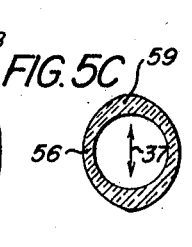
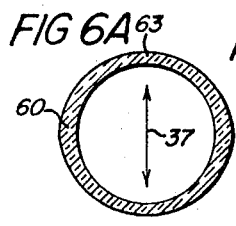 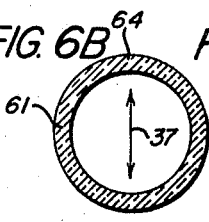 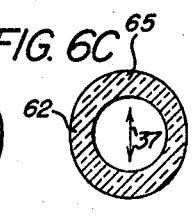
INVENTOR
FRED R. YOUNGREN
BY *H. Vincent Harsha*
ATTORNEY United States Patent Office 3,314,070
Patented Apr. 11, 1967

3,314,070
TAPERED RADOMES
Fred R. Youngren, Bedford, Mass., assignor, by mesne assignments, to the United States of America as represented by the Secretary of the Army
Filed Apr. 30, 1959, Ser. No. 810,175
8 Claims. (Cl. 343—708)

This invention relates to radomes and more particularly to radomes which are tapered in a particular manner to reduce the refraction of electromagnetic energy passing therethrough.

In directional energy radiating systems of the kind in which a radome is placed as a protective housing or shield over the scanning dish of a radar, refraction in electromagnetic energy passing through the curved wall of the radome is relatively great and results in boresight error in which a target appears to be angularly displaced from its true position relative to the radar dish. This refraction of energy arises from the fact that the curved radome wall presents a multiplicity of differing incidence angles and correspondingly differing delays to the entire area of the incoming radar beam. This results in both attenuation and non-uniform phase shift of the energy in the beam. In particular, the plane front of the radar beam, which is usually plane polarized for directivity purposes, becomes rotated and refracted in its passage through the curved radome wall. Attempts to introduce discontinuities into the radome wall thickness or to introduce a rotationally symmetrical longitudinal taper to reduce refraction and boresight error still result in non-uniform phase shift over the area of the beam.

Refraction of the beam is particularly objectionable in radomes which are used in high speed objects such as missiles and supersonic aircraft. Here it is desirable if not necessary from an aerodynamic standpoint to utilize a long and pointed radome or a radome having a high-fineness ratio, i.e., a radome having a relatively large ratio of length to diameter. A radome of this shape, however, tends to produce an unsymmetrical insertion phase delay compared with the symmetrical insertion phase delay present in hemispherical-shaped radomes. It is, therefore, desirable to provide a radome which has the advantages of a high-fineness ratio for aerodynamic purposes and at the same time the advantages gained by a hemispherical shape to obtain a substantially symmetrical phase shift for each direction in which the radar beam is directed.

In accordance with the radome of the invention, a hollow cone-shaped member of dielectric material, such as an aluminum oxide ceramic, is uniformly tapered in a circumferential direction, that is, the thickness varies from one radial direction to antoher, as well as in a longitudinal direction so that oppositely disposed portions of the radome wall uniformly increase in thickness from a predetermined minimum cross-section. The radome is illuminated with polarized electromagnetic energy by positioning an antenna, such as a radar scanning dish, within the nose portion of the radome. The antenna is so positioned that the degree of taper of the radome is greatest on the sides that are perpendicular to the E-vector of the polarized energy, while the taper of the surface of the radome which is parallel to the E-vector remains substantially constant. Whether the inner surface of the radome is shaped and the outer surface approximates a surface of revolution, or whether the outer surface is shaped and the inner surface is circular, is not essential to the proper operation of the invention. In either case, the taper of the dielectric material produces a boresight shift in the radome by attenuating and changing the phase delay on one side of the radar beam passing therethrough. This boresight shift or change in insertion phase delay is of an opposite sign from that already present in the radome and thereby results in a greatly reduced boresight error for the combination. In this manner, a radome is provided which has a high-fineness ratio to be used with high-speed aircraft and a low boresight error for accurate target information.

Further objects and advantages of this invention will be more apparent as the description progresses, reference being made to the accompanying drawing wherein:

FIG. 1 is a sectional illustration of the radome of the invention for use in the nose assembly of a high-speed vehicle;

FIG. 2 is a generalized schematic illustration of the radome of the present invention.

FIGS. 3A, 3B and 3C are cross-sectional views showing a radome tapered on its inner surface in a circumferential direction taken along the cutting planes A—A, B—B and C—C of the schematic view of FIG. 2;

FIGS. 4A, 4B and 4C are cross-sectional views of a radome tapered at its inner surface in both a circumferential and longitudinal direction, the views being taken along the cutting planes A—A, B—B and C—C of the schematic view of FIG. 2;

FIGS. 5A, 5B and 5C are cross-sectional views showing another embodiment of the radome tapered at its outer surface only in a circumferential direction; and FIGS. 6A, 6B and 6C are cross-sectional views showing a radome tapered at its outer surface in both a circumferential and longitudinal direction.

In the accompanying drawing, FIG. 1 shows a radome 10 forming a nose assembly for a high speed vehicle or the like, not shown, including a body portion 11 and a pointed nose portion 12. The radome in this specific instance has a fineness ratio or a ratio of length to maximum diameter of approximately 2:1. A substantially circular mounting plate or bulkhead 14 is connected by any suitable means (not shown) to the inner surface of the radome and is used as a mounting bracket for a paraboloidal antenna or radar dish, generally designated by the reference numeral 20. The radar dish is carried by the mounting plate 14 and extends substantially longitudinally of the enclosing radome 10. The radar dish 20 includes a housing or casing 22, gimbal arms 24 and 26, reflector 28 and an antenna feed 30. The reflector 28 and antenna feed 30 are constructed as a unit and, as shown in the drawing, assume a position wherein their longitudinal axes coincide with the longitudinal axis of the radome 10. The reflector 28 is connected to gimbal arms 26 for rotary scanning movement about the axis of a shaft 32 and gimbal arms 26 are, in turn, operatively connected to gimbal arms 24 for rotation about the axis of a shaft 34 carried thereby, the axis of shaft 34 being normal to the axis of shaft 32. Being so mounted, the radar dish 28 is capable of being rotated about the two intersecting axes spaced 90 degrees apart and is thus capable of both a pitching movement, rotation about shaft 32, and a yawing movement about shaft 34 or a combination of both. Some of the various pitching or vertical positions of the scanning dish 28 are shown in the dotted lines in the drawing. The mechanism for imparting movement to the gimbal scanning dish 28 is carried within the housing 22 of the radar apparatus and for the sake of brevity will not be described herein inasmuch as such apparatus and the construction thereof are well known in the art and form no part of the present invention.

To illuminate the radar reflector 28 with polarized energy, the antenna feed 30 is a rectangular section of waveguide which extends through an aperture in the reflector 28 and is supported thereby. Electromagnetic energy is fed by way of a coaxial cable 35 into the rectangular waveguide feed section 30 by means of a well-known rotary joint 36. The end portion of rectangular waveguide 30 is positioned in a manner to permit energy to radiate directly toward the reflector 28. In this manner, the illuminated parabolic reflector reflects or receives electromagnetic energy through the tapered wall of surrounding radome 10. As noted, a non-tapered radome bends the rays of energy returning from a target so that the target will appear to be displaced from its true position by an angle which is called the radome's bore-sight error angle, as shown in FIG. 1. This angle is usually not zero and usually changes in magnitude and sign depending upon which region of the radome is between the radar dish and the target.

In accordance with the preferred embodiment of the invention, however, the radome of FIG. 1 is tapered both circumferentially and longitudinally to reduce the boresight error angle substantially to zero. In particular, FIG. 2 shows a schematic diagram of an ogive-shaped tapered radome capable of reducing boresight error. To describe the circumferential taper FIGS. 3A, 3B and 3C show sections of the radome of FIG. 2 as seen in their respective cutting planes. The radome shown in FIGS. 3A, 3B and 3C, for purposes of illustration, is uniformly tapered in a circumferential direction, while the taper of the longitudinal surface of the radome remains constant. In this figure, as shown, the inner surface of the radome is shaped to provide the taper of the radome. The outer surface is circular and approximates a surface of revolution. An arrow 37 represents the direction of the E-vector of the polarized energy with respect to the radome. The circumferential taper of the dielectric material forming the wall of the radome is shown by the change in thickness of the wall from 40 to 44. The wall has the greatest width in the sides which are perpendicular to the E-vector that is along the minor axis of the approximate ellipse formed by said sides. However, the width of the sides at 40, 41 and 42 along this minor axis of the ellipse remain constant. The sides 44, 45 and 46 along the major axis of the approximate ellipse which are parallel to the E-vector also remain constant, as shown in FIGS. 3A, 3B and 3C. It should be understood that the circumferential taper as shown performs an important part of the correction for refractions, although not as effective as the combination of the longitudinal and circumferential taper. It should also be understood that FIG. 2 is for the purpose of representing the particular cutting planes for the cross-sectional illustrations.

Referring to FIGS. 4A, 4B and 4C, the preferred embodiment of the radome is shown uniformly tapered in a longitudinal direction as well as in a circumferential direction. Here the circumferential taper is shown by the change in thickness from 47 to 50, 48 to 51 and 49 to 52 of FIG. 4. The longitudinal taper is shown by the increase in thickness from 47 to 48 to 49. Additionally, the surface of the radome which is parallel to the E-vector, as shown at 50 in FIG. 4A, 51 in FIG. 4B and 52 in FIG. 4C, is also longitudinally tapered. These longitudinal tapers may differ from each other. For example, while the wall thickness taper from 47 to 49 varies from .20 to .30 inch, the longitudinal taper from 50 to 52 which is parallel to the E-vector, preferably, varies from a wall thickness of approximately .22 to .26 inch. By introducing the circumferential taper, which causes the difference in the two longitudinal tapers, the insertion phase delay which causes boresight error is compensated to an even greater extent than possible with only a longitudinal taper. The delay of the polarized energy through the radome is made substantially equal over the entire area of the incoming beam.

Referring again to FIG. 1, the radome material is preferably a ceramic such as aluminum oxide, $Al_2O_3$, commonly referred to as "alumina." The inner tapered surface of the radome is cut out by a cam shaped grinder, not shown, in a well-known manner which follows a shaped pattern to provide the particular desired contour. While the preferred embodiment discloses the use of a ceramic radome material, it should be understood that glass, plastic or quartz or any similar dielectric material can be used and the contour of the cone can be either ground or cast according to well-known techniques.

Referring now to FIGS. 5A, 5B and 5C and FIGS. 6A, 6B and 6C the inner surface of the radomes aproximate a surface of revolution. The outer surfaces of FIGS. 5A, 5B and 5C are shaped so that the radome is tapered only in a circumferential manner. The surface parallel to the E-vector, in FIGS. 5A, 5B and 5C, as shown at 54, 55 and 56 remains substantially constant, while the sides at 57, 58 and 59 which are perpendicular to the E-vector of the polarized energy are also substantially constant but of different thickness. In the embodiment shown in FIGS. 6A, 6B and 6C, the radome is tapered in a longitudinal direction as well as in a circumferential direction. The longitudinal taper for points along the radome wall is shown by the increase in wall thickness from 60 to 61 to 62, while the circumferential taper is shown by the difference in thickness from 60 to 63, 61 to 64, and 62 to 65. In either case, the taper of the dielectric material produces a boresight shift at the radome wall by attenuating one portion of the radar beam passing therethrough and changing the insertion phase delay in a direction to correct boresight error angle. It should be understood that the outer surface of the radome is shaped by grinding in the aforementioned well-known manner. The selection of the specific shape and taper of the radome is determined for the most part by the specific results it is desirable to obtain in a given radome.

While the preferred structural embodiment of the invention is a single integral member, the radome can be constructed of honeycomb, foam or multi-ply laminated construction made of inner ply and outer ply members made of fiber glass, or the aforementioned materials. In addition, to ogive-shaped radomes, the invention applies to radomes of other configurations, such as cones, paraboloids, and Newtonian shapes. Accordingly, it will be apparent to those skilled in the art that many other materials or combination of materials can be satisfactorily utilized in place of the preferred embodiment. It is, therefore, to be understood that within the scope of the appended claims the invention may be practiced otherwise than as specifically described.

What is claimed is:

1. A radome comprising a member of dielectric material, the outer surface of said member approximating a surface of revolution about the longitudinal axis of said radome, the inner surface of said member being uniformly shaped around its circumference substantially in the shape of an ellipse, thereby to define a wall gradually decreasing in width from said ellipse's minor axis.

2. A radome comprising a substantially pointed member of dielectric material, the outer surface of said member approximating a surface of revolution about the longitudinal axis of said radome, the inner surface of said member being uniformly shaped around its circumference substantially in the shape of an ellipse, thereby to define a wall gradually decreasing in width from the ellipse's minor axis, said inner surface being uniformly shaped along its length to provide a radome wall of increasing width toward the tip of said radome.

3. In combination, a moving vehicle, a radar device carried by said moving vehicle, a radome having a high-fineness ratio carried by said moving vehicle on the forward end thereof and enclosing said radar device, said radome including a cone-shaped member of dielectric material, the outer surface of said member approximating a surface or revolution about the longitudinal axis of said radome, the inner surface of said member being uniformly shaped around its circumference to define a surface approximating the shape of an ellipse having a gradually increasing width along said ellipse's major axis.

4. In combination, a moving vehicle, a radar device carried by said moving vehicle, a radome having a high fineness ratio carried by said moving vehicle on the forward end thereof and enclosing said radar device, said radome including a cone-shaped member of dielectric material, the inner surface of said member approximating a surface of revolution about the longitudinal axis of said radome, the outer surface of said member being uniformly shaped around its circumference to define a surface approximating the shape of an ellipse having a gradually increasing width along said ellipse's major axis.

5. In combination, a missile or the like, a radar device carried by said missile, a radome having a predetermined fineness ratio carried by said missile and enclosing said radar device, said radome including an elongated member of dielectric material, the outer surface of said member approximating a surface of revolution about the longitudinal axis of said radome, the inner surface of said member being uniformly shaped around its circumference, thereby to define a wall approximating the shape of an ellipse having a gradually decreasing thickness along the ellipse's major axis.

6. A radome assembly for a high speed object such as an aircraft or the like comprising a radar scanning device carried by said high speed object and including a reflector and antenna feed movable between a plurality of scanning positions and adapted to direct polarized energy through said radome, said radome being made of an elongated dielectric material carried by said high speed object and enclosing said radar scanning device, said radome being uniformly tapered in a circumferential manner to provide a wall of decreasing thickness parallel to the electromagnetic E-vector of said polarized energy, and to provide a wall of constant thickness in a direction perpendicular to said E-vector, thereby to reduce the boresight error of said radome as said reflector and antenna feed are moved through said plurality of scanning positions.

7. A radome comprising a substantially cone-shaped wall of dielectric material having inner and outer surfaces; one of the inner and outer surfaces of said wall being circular in cross-section; the other surface being elliptical in cross-section and having a major and a minor axis; a ratio of the major axis to the minor axis of the elliptical cross-section increases progressively in a direction along a longitudinal axis of the radome from a base to an apex of said cone-shaped wall.

8. A radome comprising a substantially cone-shaped wall of dielectric material having inner and outer surfaces; one of the inner and outer surfaces of said wall being substantially circular in cross-section; the other surface being elliptical in cross-section and having a major and a minor axis; the wall having a thickness which increases along the major axis of the ellipse and remains constant along the minor axis of the ellipse as the total cross-sectional area is decreased along a longitudinal axis of the radome.

References Cited by the Examiner

UNITED STATES PATENTS

| 2,755,216 | 7/1956 | Lemons | 343—18 |
| 2,854,668 | 9/1958 | McMillan et al. | 343—18 |
| 3,063,654 | 11/1962 | Youngren et al. | 343—18 X |

FOREIGN PATENTS 800,769   9/1958   Great Britain.

OTHER REFERENCES

American Ceramic Society Bulletin: Vol. 34, No. 5 (1955); Ceramic Radomes for Aircraft, pp. 145–150.

Electrical Design of Lossy High-Incidence Radomes, by Aeronautical Electronic and Electrical Lab., U.S. Naval Air Development Center, Johnsville, Pa. Report No. ADC EL–123–50, July 11, 1950, pp. 106 and 111 relied on.

HERMAN KARL SAALBACH, *Primary Examiner.*

FREDERICK M. STRADER, *Examiner.*

D. MEXIC, T. D. JENNINGS, M. NUSSBAUM,
*Assistant Examiners.*